United States Patent [19]

Mickelson et al.

[11] 4,098,221
[45] Jul. 4, 1978

[54] DRUM ROTATION INDICATOR

[75] Inventors: Roger D. Mickelson, Cedar Rapids, Iowa; John Eric Doyle, Menlo Park, Calif.; David L. Willard, Cedar Rapids, Iowa

[73] Assignee: FMC Corporation, San Jose, Calif.

[21] Appl. No.: 682,928

[22] Filed: May 4, 1976

[51] Int. Cl.² ............................................. G01P 13/00
[52] U.S. Cl. .................................. 116/114 G; 116/115
[58] Field of Search ............. 116/115, 114 G, 114 W, 116/114 R, DIG. 17, 124 F, 124 A, 124 R; 254/150 R

[56] References Cited

U.S. PATENT DOCUMENTS

| | | | |
|---|---|---|---|
| 105,071 | 7/1870 | Harris | 116/115 |
| 1,467,373 | 9/1923 | Gowin | 116/114 D |
| 2,717,993 | 9/1955 | Newsom | 116/124 F |
| 2,745,633 | 5/1956 | Cornwell | 254/150 R |
| 2,802,441 | 8/1957 | Epstein | 116/115 |

*Primary Examiner*—S. Clement Swisher
*Assistant Examiner*—Denis E. Corr

*Attorney, Agent, or Firm*—J. F. Verhoeven; J. W. Edwards; C. E. Tripp

[57] ABSTRACT

A drum rotation indicator enables a crane operator to sense rotation of a drum, and thereby determine linear movement of a cable, that has one end wound about the drum. This indicator has a cam, that rotates with the drum, and a cam follower, that translates rotation of the cam into linear movement. A readout plunger is located conveniently for the operator's hand, and linear motion that is induced by the cam follower is transferred to the readout plunger by a medium that can be a mechanical linkage, a push-pull cable, or a hydraulic system. In a preferred embodiment of the invention, the cam follower disengages automatically from the cam after linear motion has been transferred to the readout plunger. The linear motion transferring medium also transfers motion from the readout plunger to the cam follower, which pivots into engagement with the cam. The cam has a serrated periphery, to give an instantaneous response, upon rotation of the drum, to engagement of the cam follower with the cam.

10 Claims, 4 Drawing Figures

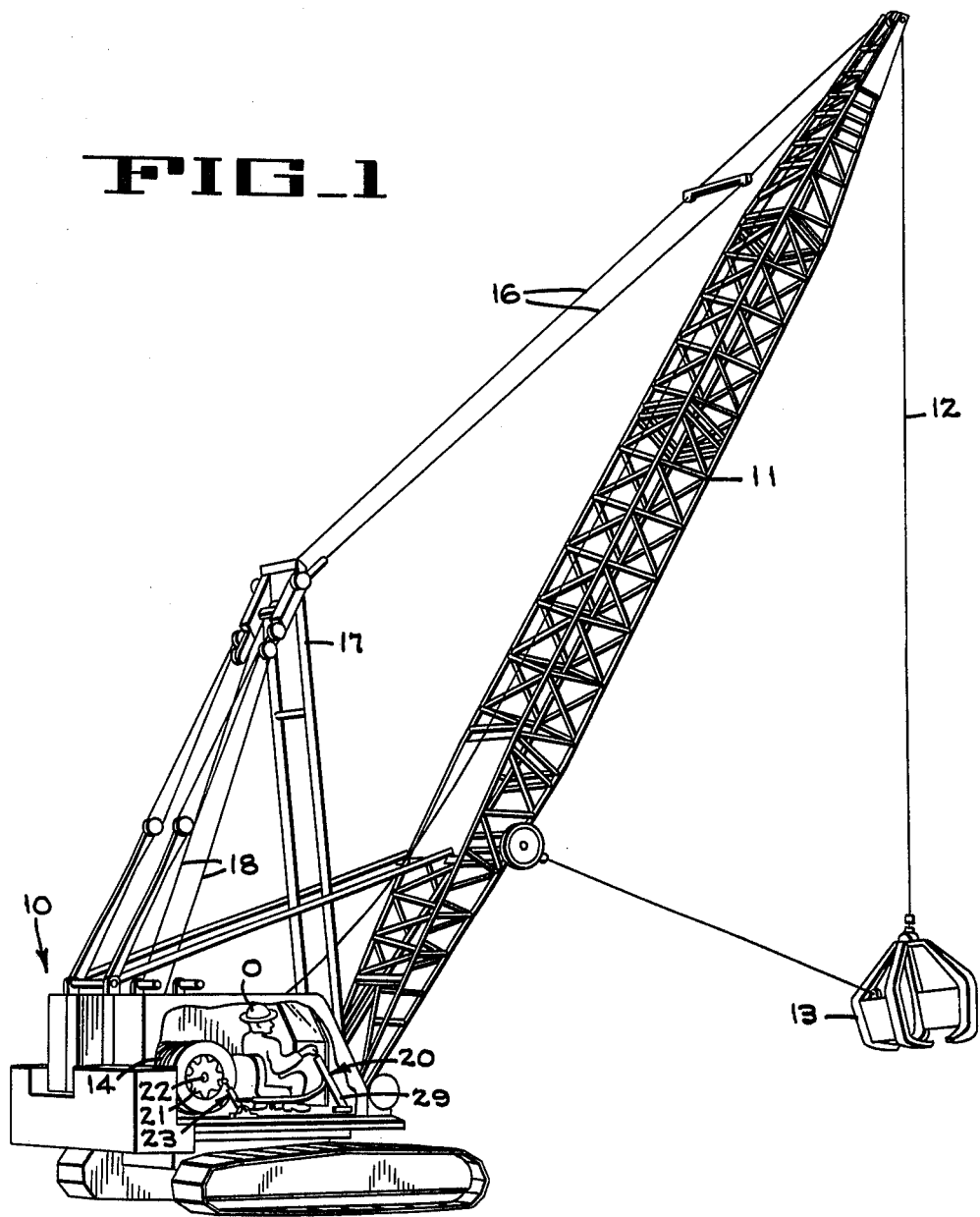

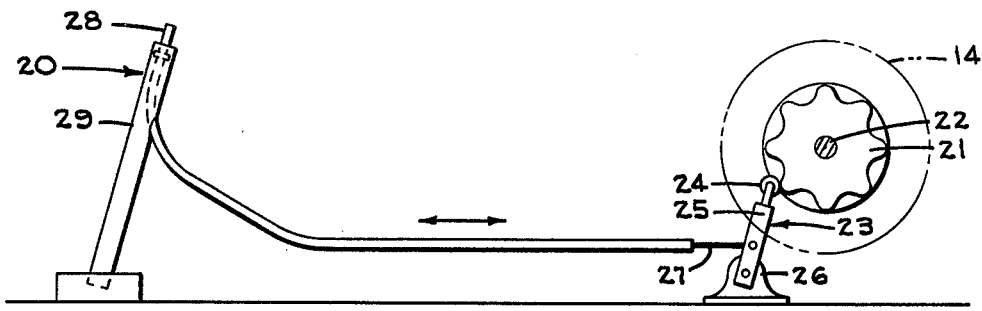
FIG_2
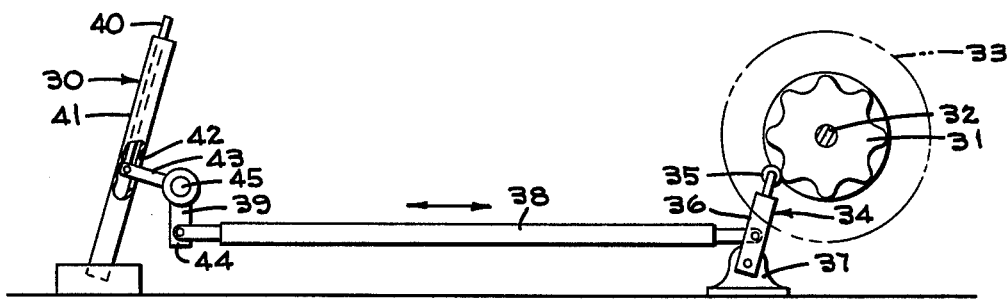
FIG_3
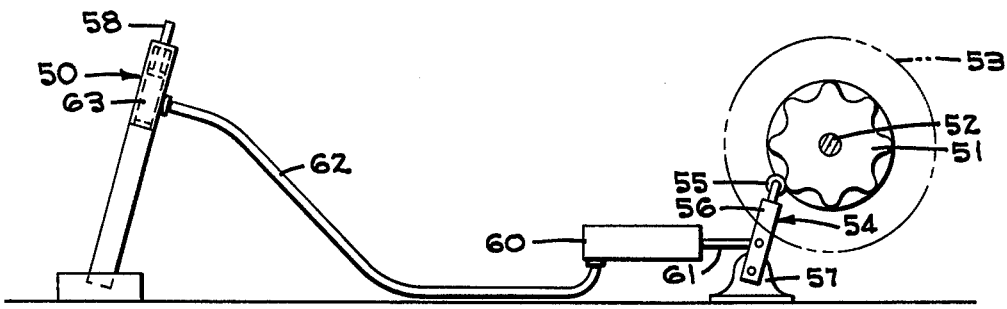
FIG_4

DRUM ROTATION INDICATOR

BACKGROUND OF THE INVENTION

1. Field of the Invention

This invention relates to a drum rotation indicator. More specifically, it concerns such an indicator, for use in a crane, to enable the crane operator to physically sense linear movement of a cable, that has one end wound about a drum and another end attached to a gripping implement, when neither end of the cable can be seen by the crane operator without distracting his attention from a signal man.

2. Description of the Prior Art

Drum rotation indicators have been used to detect motion of a hoist drum in a crane, as shown in the U.S. Pat. Nos. 2,717,993; 2,745,633 and 2,776,814. All of these patents show feel type indicators that are driven by a rotary cable with motion being taken from a hoist drum. Among the problems associated with rotary cable driven indicators are difficulty in turning the unit off when not in use and inaccuracy in reading the unit due to wind-up of the cable immediately after being turned on.

In addition to the rotary cable and feel type indicator shown in U.S. Pat. No. 2,717,993, this patent also shows a light or buzzer that can be actuated by rotation of a cam, which engages a pin of a make and break switch, thus causing the contacts to make and break on each rotation of the cam. In this patent, the cam rotates with the cable, but such an indicator cam could be mounted to rotate with the drum. Electrical units are known, to have a roller switch riding on a cam or a proximity switch sensing gear teeth, to produce electrical signals, that are usually transformed to either a beeping horn or to mechanical pulses created by a solenoid. These electrical units require a manual ON-OFF control. The switch mechanism usually runs all the time, thus reducing the switch life. The electrical circuitry often makes trouble shooting more difficult than mechanical units. Sound units, such as a beeping horn or a buzzer, are not accepted by some equipment operators because of irritable horn noise. Mechanical pulsating units of the solenoid type usually give weak signals to the operator.

U.S. Pat. No. 1,467,373 shows an apparatus for measuring the extent of vibration of a shaft within its bearing. This apparatus includes a vibratory needle that is slidably carried by a standard. The needle is resiliently urged from the standard, in a radial direction towards the shaft, to contact the shaft with a bearing foot, that is carried at one end of the needle, and an indicator knob is mounted at the other end of the needle, so that, any vibrations of the shaft can be readily determined by observing the knob.

SUMMARY OF THE INVENTION

A drum rotation indicator enables a crane operator to sense rotation of a drum, that cannot be observed directly by the operator, and such drum rotation indicates linear movement of a cable, that has one end wound about the drum. The indicator provides an instantaneous readout response to actuation by the operator, and this indicator shuts off automatically after giving the response. A readout plunger, that is located conveniently for the operator's hand, is moved linearly, in response to rotation of the drum, with sufficient force to give a positive feel, to the operator's hand.

A drum rotation indicator has a cam that is mounted to rotate with a drum. A cam follower translates rotation of the cam into linear movement of a transferring medium. A signal is given to an operator by a readout plunger, that moves linearly in response to the medium for transferring linear motion induced by the cam follower to the readout plunger. In a preferred embodiment of the invention, the cam follower disengages from the cam, after inducing linear motion to be transferred to the readout plunger. The linear motion transferring medium also transfers motion from the readout plunger to the cam follower which pivots into engagement with the cam. The cam has a serrated periphery, to give an instantaneous response, upon rotation of the drum, to engagement of the cam follower with the cam. The linear motion transferring medium can be a mechanical linkage, a push-pull cable, or a hydraulic system.

BRIEF DESCRIPTION OF THE DRAWING

FIG. 1 is a schematic view of a crane with a drum rotation indicator embodying the present invention.

FIG. 2 is an enlarged diagrammatic view of the drum rotation indicator, shown in FIG. 1, having a push-pull cable, as a linear motion transferring medium.

FIG. 3 is a diagrammatic view of a modified form of drum rotation indicator, that has a mechanical linkage as a linear motion transferring medium.

FIG. 4 is a diagrammatic view of another modified form of drum rotation indicator, that has a hydraulic system, as a linear motion transferring medium.

DESCRIPTION OF THE PREFERRED EMBODIMENTS

With reference to FIG. 1, a crane 10 has a pivotally mounted boom 11. A hoist line 12 extends over the tip of the boom to support a grapple 13, at one end of the line, and the opposite end of the line is wound about a hoist drum 14. An operator O is seated in a position where he normally has an unobstructed view of the grapple, but occasionally, an intervening wall, such as the side of a railroad gondola car or a high stack of logs, will prevent the operator from seeing the grapple. Under such conditions, the operator must rely upon a spotter to act as a second pair of eyes and to give signals for what the operator should do. Since the operator must watch the spotter, his eyes cannot be directed toward the drum to determine if the drum is rotating.

The boom 11 is supported at its tip end by a pair of boom pendants 16, that extend between the boom tip and an outer end of a live mast assembly 17. A pair of boom hoist lines 18 are connected to the outer end of the live mast assembly and have opposite ends wound about a boom hoist drum, not shown. When the boom is near an upright position or a maximum boom angle position and the operator O must watch a spotter or the grapple 13, while raising or lowering the boom, he cannot observe rotation of the boom hoist drum or movement of the boom hoist lines.

A drum rotation indicator 20 is provided to enable the operator O to detect motion of a revolving drum, such as the hoist drum 14, while maintaining his eyes toward a spotter or signal man. This indicator has a cam 21, that is mounted upon a shaft 22, to rotate with the drum. The outer bearing support, for the shaft, has been broken away to more clearly show the cam, which has a serrated periphery that is engaged by a cam follower 23. As more clearly shown in FIG. 2, the cam follower includes a roller 24, that is pinned to the swinging end of an arm 25, and the arm has an opposite end that is pivotally connected to a bracket 26. Thus, upon rotation of the drum, the roller moves, from a position in engagement with the serrated periphery of the cam to a disengaged position, and the arm will pivot, to induce a linear movement in a linear movement transferring medium. A push-pull cable 27 serves as the medium which transfers this linear movement induced by the cam follower arm to a readout plunger 28, that is located conveniently for the hand of the operator. This readout plunger is slidably fitted within a support sleeve 29 that could also be a lever for controlling rotation of the drum.

To operate the drum rotation indicator 20, the operator O depresses the readout plunger 28 and this motion is transferred by the push-pull cable 27 to force the cam follower 23 into engagement with the cam 21. Any movement of the cam can be instantly detected by feel of the operator. For each serration, the cam forces the cam follower backward to a disengaged position. This movement is returned by the push-pull cable to the readout plunger, which moves back to its original position. If the operator maintains a constant pressure on the readout plunger, he can count the number of linear pulses of the plunger, and knowing the number of serrations on the cam, he can determine the amount of drum rotation or linear movement of the hoist line. By observing the frequency of the pulses, the operator can determine how fast the drum is rotating. When the operator releases pressure on the readout plunger, the cam will push the follower back, and since there is no force on the plunger, the indicator will automatically shut-off, when the follower clears the cam.

A second embodiment of the invention is illustrated in FIG. 3. A modified form of drum rotation indicator 30 has a cam 31, that is mounted upon a shaft 32, to rotate with a drum 33. The outer periphery of the cam is serrated, and this portion of the cam is engaged by a cam follower 34. This follower has a roller 35, that is pinned to the swinging end of an arm 36. The opposite end of the arm is pivotally connected to a bracket 37. Thus, rotation of the drum and the cam forces the roller back, from a position in engagement with the serrated periphery of the cam to a disengaged position. This movement of the roller pivots the cam follower arm. A mechanical linkage, that includes a connecting rod 38 and a bell crank 39, serves as a medium for transferring linear motion induced by the arm of the cam follower to a readout plunger 40. The readout plunger is slidably fitted within a support sleeve 41, that has a slot 42 for receiving the bell crank arm 43, that is attached to the plunger. The bell crank has an arm 44, that is attached to the connecting rod, and this crank is mounted to pivot about the shaft 45. The operation of the drum rotation indicator 30 is similar to that previously described for the drum rotation indicator 20.

A third embodiment of the invention is illustrated in FIG. 4. A modified form of drum rotation indicator 50 has a cam 51, that is mounted upon a shaft 52, to rotate with a drum 53. The outer periphery of the cam is serrated, and this portion of the cam is engaged by a cam follower 54. This follower has a roller 55 that is pinned to the swinging end of an arm 56. The opposite end of the arm is pivotally connected to a bracket 57. Thus, rotation of the drum and the cam forces the roller back, from a position in engagement with the serrated periphery of the cam, to a disengaged position. This movement of the roller pivots the cam follower arm. A hydraulic system serves as a medium for transferring linear motion from the arm to a readout plunger 58. This hydraulic system includes a first hydraulic cylinder 60 with a piston rod 61 that is connected to the cam follower arm. An oil supply line 62 extends from the first hydraulic cylinder to a second hydraulic cylinder 63. The readout plunger 58 is a piston rod extending from the second hydraulic cylinder. The operation of the drum rotation indicator 50 is similar to that previously described for the drum rotation indicator 20.

From the foregoing description, it will be apparent that the drum rotation indicators 20, 30 and 50 provide an instantaneous readout response to actuation by an operator. These indicators shut-off automatically after giving the response. The readout plungers are located conveniently for the operator's hand, regardless of the drum location. Linear movement of the readout plunger, in response to rotation of the drum, provides sufficient force to give a positive feel to the operator's hand.

Although the best mode contemplated for carrying out the present invention has been herein shown and described, it will be apparent that modification and variation can be made without departing from what is regarded to be the subject matter of the invention.

What is claimed is:

1. A device for indicating rotation of a drum, said device comprising a cam mounted in coaxial relationship for positive rotation with the drum, a cam follower pivotally mounted adjacent the cam for translating cam rotation into motion in a direction away from contact with the cam, a readout plunger mounted for reciprocating motion at a location remote from the drum, and a medium that interconnects the cam follower with the readout plunger for positively transferring motion therebetween in either direction and for maintaining the relative positioning of both the cam follower and the readout plunger after the transfer of motion in one direction from one end of the medium until reversely acted upon by motion in the opposite direction from the opposite end of the medium.

2. The drum rotation indicator described in claim 1, wherein said medium for transferring motion is a mechanical linkage.

3. The drum rotation indicator described in claim 2, wherein said mechanical linkage includes a bell crank and a connecting rod.

4. The drum rotation indicator described in claim 1, wherein said cam follower disengages from said cam upon transferring motion away from contact with the cam to the medium which in turn transfers the motion to the readout plunger.

5. The drum rotation indicator described in claim 1, wherein said motion transferring medium also transfers motion from the readout plunger to the cam follower.

6. The drum rotation indicator described in claim 5, wherein said cam follower is forced into engagement with the cam by the transfer of motion from the readout plunger to the cam follower.

7. The drum rotation indicator as described in claim 6, wherein said cam has a serrated periphery to give an instantaneous response upon rotation of the drum to engagement of the cam follower with the cam.

8. A drum rotation indicator comprising a cam that is mounted to rotate with a drum, a cam follower that translates rotation of the cam into linear movement, a readout plunger that moves linearly to give a touch signal to an operator, and a medium for transferring linear motion induced by the cam follower to the readout plunger, said medium for transferring linear motion being a push-pull cable.

9. A drum rotation indicator comprising a cam that is mounted to rotate with a drum, a cam follower that translates rotation of the cam into linear movement, a readout plunger that moves linearly to give a touch signal to an operator, and a medium for transferring linear motion induced by the cam follower to the readout plunger, said medium for transferring linear motion being a hydraulic system.

10. The drum rotation indicator described in claim 9, wherein said hydraulic system includes a first cylinder with a piston rod connected to the cam follower, a second cylinder with the readout plunger acting as a piston rod, and an oil supply line extending between the first cylinder and the second cylinder.

* * * * *